United States Patent
Suder et al.

(10) Patent No.: US 7,123,699 B2
(45) Date of Patent: Oct. 17, 2006

(54) VOICE MAIL IN A VOICE OVER IP TELEPHONE SYSTEM

(75) Inventors: Eric G. Suder, Plano, TX (US); Harold E. A. Hansen, II, Plano, TX (US)

(73) Assignee: Estech Systems, Inc., Plano, TX (US)

( * ) Notice: Subject to any disclaimer, the term of this patent is extended or adjusted under 35 U.S.C. 154(b) by 378 days.

(21) Appl. No.: 10/210,902

(22) Filed: Aug. 2, 2002

(65) Prior Publication Data

US 2004/0022373 A1 Feb. 5, 2004

Related U.S. Application Data

(63) Continuation-in-part of application No. 09/775,018, filed on Feb. 1, 2001.

(51) Int. Cl.
*H04M 11/00* (2006.01)

(52) U.S. Cl. .............................. 379/88.18; 379/88.17; 379/88.22; 379/93.01

(58) Field of Classification Search ................ 379/67.1, 379/69, 70, 74, 77, 84, 85, 88.11, 88.12, 88.13, 379/88.16, 88.17, 88.18, 88.19, 88.22, 88.25, 379/93.01, 93.26, 201.01, 207.02, 220.01, 379/229, 265.01, 265.09; 370/351, 352, 370/431, 437, 464, 456

See application file for complete search history.

(56) References Cited

U.S. PATENT DOCUMENTS

| | | | | |
|---|---|---|---|---|
| 5,819,005 A | * | 10/1998 | Daly et al. | 704/200 |
| 5,946,386 A | * | 8/1999 | Rogers et al. | 379/265.09 |
| 6,317,485 B1 | * | 11/2001 | Homan et al. | 379/88.12 |
| 6,529,500 B1 | * | 3/2003 | Pandharipande | 370/352 |
| 6,584,490 B1 | * | 6/2003 | Schuster et al. | 709/200 |
| 6,647,109 B1 | * | 11/2003 | Henderson | 379/220.01 |
| 6,757,363 B1 | * | 6/2004 | Platt et al. | 379/88.11 |
| 6,823,047 B1 | * | 11/2004 | Cruickshank | 379/88.18 |

\* cited by examiner

*Primary Examiner*—Ovidio Escalante
(74) *Attorney, Agent, or Firm*—Winstead Sechrest & Minick; Kelly K. Kordzik

(57) ABSTRACT

In a voice over IP system, an IP telephone includes an LED lamp that indicates a voice message has been stored in a remote voice mail system. The IP telephone can then access that voice message. The message can also be moved from one remote site to another.

5 Claims, 12 Drawing Sheets

VOICE MAIL IN A VOICE OVER IP TELEPHONE SYSTEM

This application is a continuation-in-part application of U.S. patent application Ser. No. 09/775,018, filed Feb. 1, 2001.

TECHNICAL FIELD

The present invention relates in general to information processing systems, and in particular, to the use of Voice over IP technology to transmit voice conversations.

BACKGROUND INFORMATION

Voice over IP ("VoIP") is a relatively recent development that is utilized to transmit voice conversations over a data network using the Internet Protocol ("IP"). Internet Protocol is a part of the TCP/IP family of protocols described in software that tracks the Internet address of nodes, routes outgoing messages, and recognizes incoming messages. Such a data network may be the Internet or a corporate intranet, or any TCP/IP network. There are several potential benefits for moving voice over a data network using IP. First, there is a savings in money compared to the need to use traditional tolled telecommunications networks. Additionally, Voice over IP enables the management of voice and data over a single network. And, with the use of IP phones, moves, adds and changes are easier and less expensive to implement. Moreover, additional and integrated new services, including integrated messaging, bandwidth on demand, voice e-mails, the development of "voice portals" on the Web, simplified setting up and tearing down, and transferring of phone calls are capable.

Using Voice over IP technology, phone systems can communicate with each other over existing TCP/IP data networks typically present between remote offices. This feature alone can eliminate the need for expensive, dedicated circuits between facilities. The shared bandwidth can also be used for voice calls and data communication simultaneously; no bandwidth is dedicated to one or the other.

Another advantage of a Voice over IP system is the ability to implement a phone system over an existing data network that is already connecting workstations within a local area network, such as over an Ethernet. An Ethernet operates over twisted wire and over coaxial cable for connecting computers, printers, workstations, terminals, servers, etc., within the same building or a campus. The Ethernet utilizes frame packets for transmitting information. Voice over IP can utilize such packet switching capabilities to connect IP phones onto the Ethernet.

Traditional voice mail systems within a wide area network possess limitations that reduce their effectiveness. For example, such telephone systems typically need to have either a centralized voice mail system that has to be accessed remotely, or separate and distinct voice mail systems within each location with only a limited ability to share information. What is desired is a telephone system having voice mail functionality that is essentially transparent to the location of the user.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
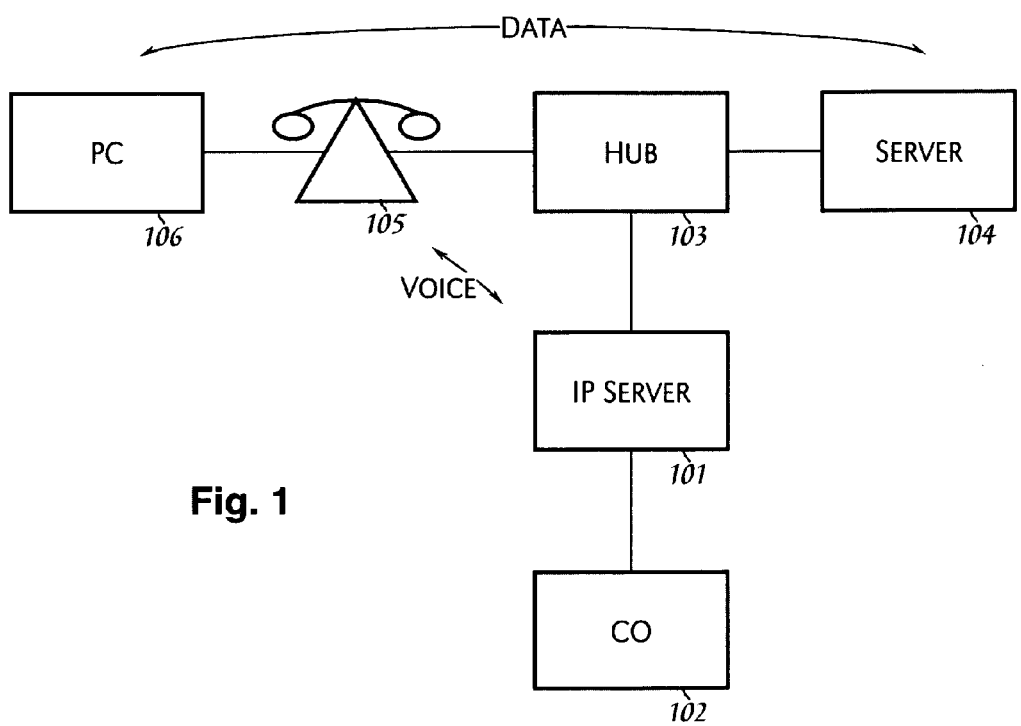
FIG. 1 illustrates an information processing system.

In the following description, numerous specific details are set forth such as specific network configurations, network devices, types of multimedia traffic, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates an information processing system configured in accordance with the present invention. FIG. 1 essentially illustrates a local area network ("LAN"), which in one configuration could be implemented with an Ethernet protocol. However, the present invention is not limited to use with any particular data transfer protocol. Workstation PC 106, network hub 103 and server 104 coupled to each other illustrate a typical LAN configuration where data is communicated between the workstation 106 and the server 104. Naturally, other workstations and servers could also be coupled to the LAN through hub 103, including the use of additional hubs. Hub 103 may be a 10 Base T or 10/100 Base T Ethernet hub. In an alternative embodiment, the hub 103 and server 104 may be implemented in the same data processing system. Herein, the term "workstation" can refer to any network device that can either receive data from a network, transmit data to a network, or both.

To add in the voice communication capabilities, an IP multimedia server 101 is coupled to hub 103 and an IP telephony device 105 is connected between the workstation 106 and the hub 103. Workstation 106 may be optional. The IP multimedia server 101 is coupled to a central office ("CO") 102 so that telephony device 105 can communicate to other telecommunications networks, such as the public switched telephone network ("PSTN"). Naturally, additional IP telephony devices 105 can be coupled to hub 103, including having workstations coupled to hub 103 through such IP telephony devices. Further details on multimedia server 101 and IP telephony device 105 are described below. An IP telephone, or telephony device, is any apparatus, device, system, etc., that can communicate multimedia traffic using IP telephony technology. IP telephony is defined within Newton's Telecom Dictionary, Harry Newton, Sixteenth Edition, page 454, which is hereby incorporated by reference herein. Information, or data, on the network includes both the voice and data information, and any other multimedia traffic.

Figure 2:
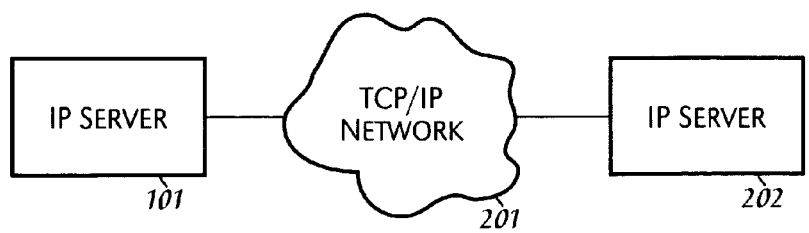
FIG. 2 illustrates a wide area network ("WAN")

FIG. 2 illustrates how the information processing system of the present invention as noted above with respect to FIG. 1 can be implemented across a wide area network ("WAN") 201 where the multimedia server 101 of FIG. 1 is coupled to another multimedia server 202 across LAN 201. Note that the other items described above in FIG. 1 have been omitted in FIG. 2 for the sake of simplicity.

Figure 3:
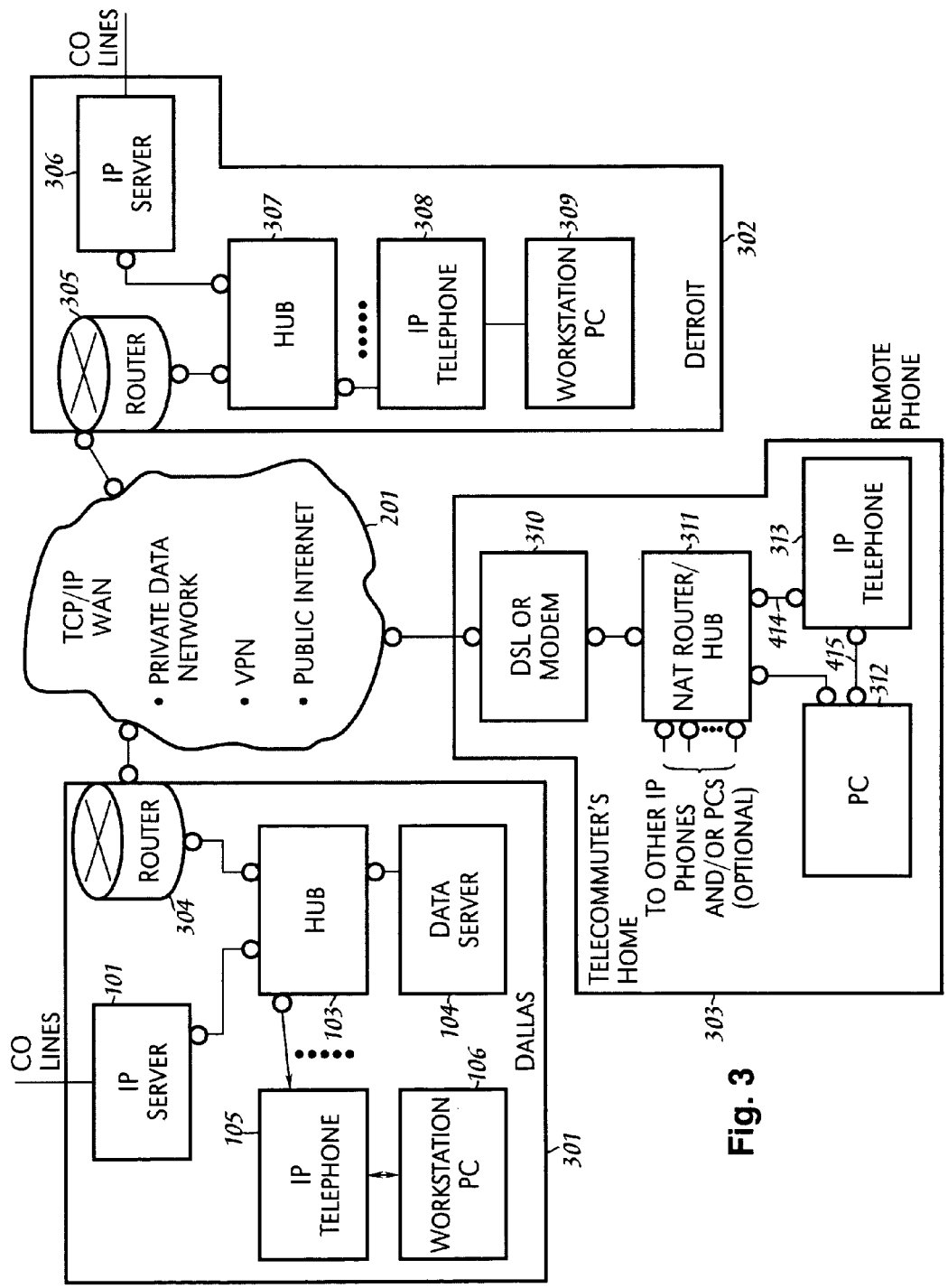
FIG. 3 illustrates another embodiment of a wide area network configuration.

FIG. 3 illustrates further detail of a configuration of the present invention over a WAN 201. Note that such a WAN may implement the TCP/IP protocol, and could be a public WAN, such as the Internet, a private data network, an intranet, or a Virtual Private Network ("VPN"). The present invention is not to be limited to TCP/IP, but is applicable to any routable network protocol (e.g., UDP).

FIG. 3 illustrates an exemplary system where WAN 201 couples an information processing system 301 in Dallas, Tex. to another information processing system 302 in Detroit, Mich., while also permitting a remote system 303 to couple to both systems 301 and 302 through WAN 201, such as from a telecommuter's home.

System 301 is similar to the system described above with respect to FIG. 1. System 301 is coupled to WAN 201 through router 304.

System 302 is similar to system 301 with the exception that a data server is not implemented within system 302. Router 305 is similar to router 304, multimedia server 306 is similar to multimedia server 101, hub 307 is similar to hub 103, IP telephony device 308 is similar to IP telephony device 105, and workstation 309 is similar to workstation 106.

Remote system 303 is coupled to WAN 201 using a modem 310, such as a cable modem or an ADSL (asymmetric digital subscriber line) modem. A NAT (Network Address Translation) router/hub 311 then couples a workstation PC 312 and an IP telephony device 313 to the modem 310. Not only can data be transferred across WAN 201 between systems 301–303, but also any one of telephony devices 105, 308 and 313 can communicate with each other and with the PSTN (not shown) over CO lines coupled to either of systems 301 and 302.

Figure 4:
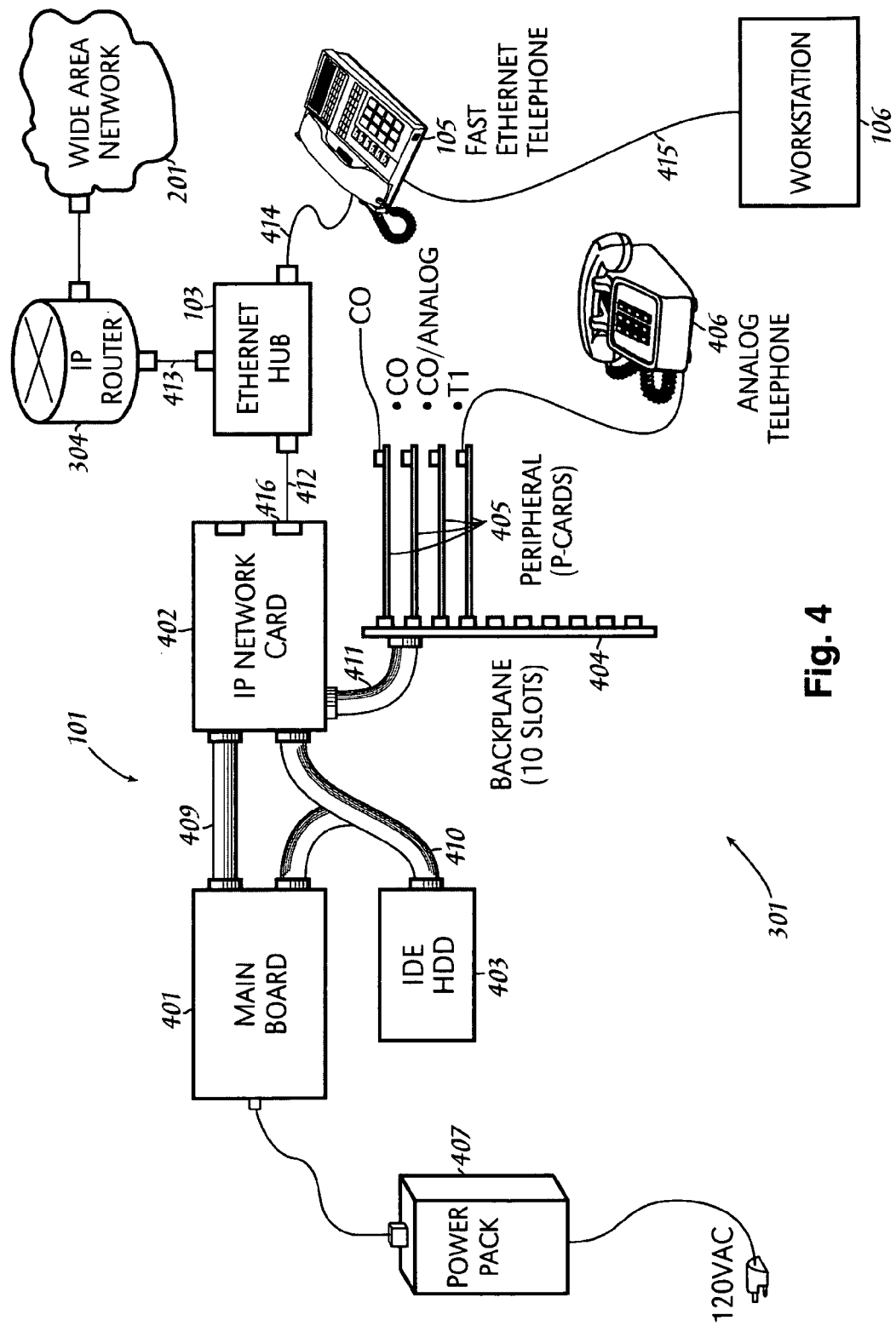
FIG. 4 illustrates a block diagram of a configuration of the present invention.

FIG. 4 illustrates further details of system 301. As noted above, system 301 is coupled to WAN 201 through IP router 304, which is coupled by line 413 to Ethernet hub 103. Ethernet hub 103 is connected by line 414 to fast Ethernet telephony device 105, which is coupled by line 415 to workstation 106. Ethernet hub 103 is coupled to LP network card 402 by connection 416, which may be a 10/100 Base T connector.

Multimedia server 101 is comprised of main board 401, network card 402, hard drive 403, backplane 404 and peripheral cards 405. Network card 402 is further discussed below in more detail with respect to FIG. 5. Network card 402 is coupled by ribbon cable 409 to main board 401, which is further described below in more detail with respect to FIG. 6. Multimedia server 101 is powered through power pack 407. IDE (Integrated Drive Electronics) HDD (hard disk drive) 403 is coupled by ribbon cable 410 to network card 402 and main board 401, while network card 402 is coupled to backplane 404 through ribbon cable 411. Backplane 404 provides capacity for several peripheral cards (P-cards) 405, which are of a typical configuration for enabling a telephone system to connect to a central office (CO), T1 lines, analog central office trunks and analog telephones 406. Alternatively, ribbon cable 411 could be coupled to one of the peripheral cards 405 directly.

Figure 5:
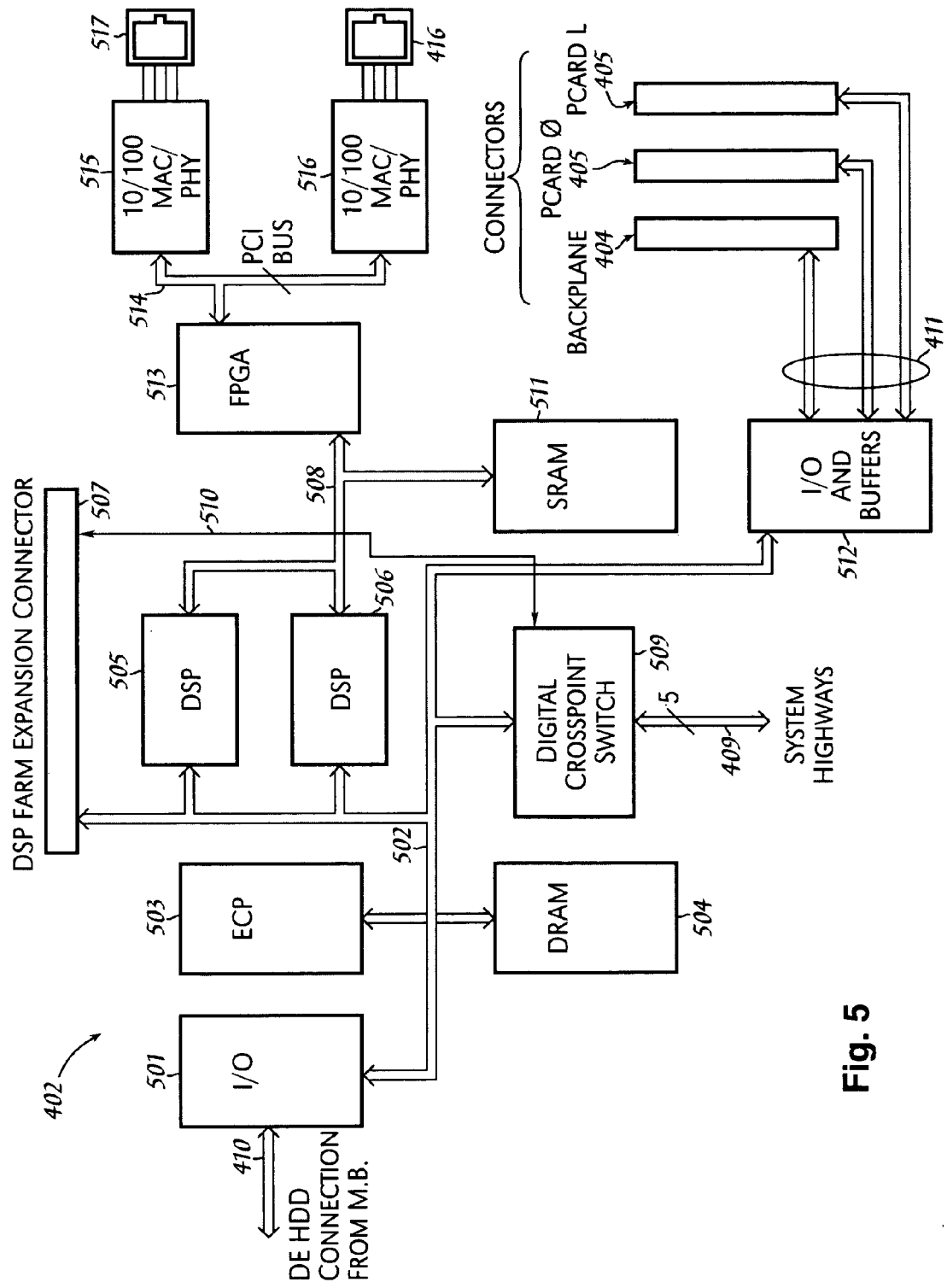
FIG. 5 illustrates a block diagram of a network card.

Referring next to FIG. 5, there is illustrated a block diagram of network card 402. Network card 402 is responsible for communicating with all IP telephones, remote telephones and remote sites via a 10/100 Base T connection. The higher-level communication protocol used may be a standard UDP/IP (User Datagram Protocol/Internet Protocol) protocol, or any other packet switching protocol. In addition, network card 402 communicates with the main board 401 for overall system control. Network card 402 has effectively replaced individual electronic key telephone circuits with a single Ethernet interface, and network card 402 now acts as the central distribution point for all peripheral cards 405, which can plug into backplane 404.

Ribbon cable 410 from hard drive 403 is received at I/O 501 coupled to bus 502. Bus 502 is coupled to ECP (Enhanced Call Processing) microcontroller 503, DRAM 504, DSPs 505 and 506, DSP farm expansion connector 507, digital cross-point switch 509, and I/O and buffers 512. ECP 503 is a microcontroller responsible for overall communications between network card 402 and main board 401. ECP 503 directly interfaces the DSPs 505, 506 via the host port interface. The host port interface is a parallel (8 bit) interface between the DSPs and the host processor. This interface can be used to directly manipulate the DSP memory by a host processor. I/O 501 is a mail box type parallel communication channel, which is multiplexed between communication with the IDE disk drive 403 and I/O 501 allowing direct control for functions such as firmware download and message passing. ECP 503 is based on a 16-bit Hitachi H8 family processor with built-in flash memory.

DSPs 505 and 506 can be implemented using Texas Instrument 5410 DSPs that perform packet encoding/decoding, jitter buffer management and UDP/IP protocol stacked functions. DSPs 505, 506 are connected to an external SRAM 511 and ASIC (FPGA) 513 that performs a PCI bridge function between bus 508 and bus 514, which is coupled to connectors 517 and 416 via 10/100 MAC/PHY devices 515 and 516. DSPs 505, 506 communicate with peripherals 405 via bus 502. DSP firmware is downloaded via the host port interface 501. I/O 501 allows communication with the main board 401 and the hard drive 403. Additionally, EPC 503 can directly control a daughter card containing additional DSPs through expansion connector 507 for functions such as speech compression.

Digital cross-point switch 509 is used to connect system voice conversations as needed between peripherals. Main board 401 houses the master cross-points with 616 discussed below with respect to FIG. 6. The peripheral cards 405 share a pool of 160 time slots. Cross-point switch 509 is primarily responsible for connecting the packet-switched voice connections of the IP telephones or remote systems to the circuit switchboard. The FPGA/PCI bridge 513 performs the functions required to connect the 10/100 Base T Ethernet MAC/PHY devices 515, 516. Since devices 515, 516 are designed to communicate via a standard PCI bus 514, the FPGA 513 implements a minimal PCI bus implementation. In addition, the FPGA 513 implements I/O latches and buffers as required.

The 10/100 Base T devices 515, 516 are stand-alone Ethernet devices, which perform the media access control ("MAC") and the PHYsical layer functions in a single, low-cost chip. Devices 515, 516 communicate to the host processor via a standard PCI bus 514, and communicate to the network via a pulse transformer coupled RJ-45 connection 517, 416. These devices contain FIFOs to minimize lost packets during traffic peaks. Per the PCI bus mastering specification, devices 515, 516 take control of the DSP bus and DMA data directly to SRAM 511. Conversely, the DSP 505, 506 writes data to be sent into the SRAM 511 and the devices 515, 516 DMA data via the PCI bus 514 to the network (LAN).

Figure 6:
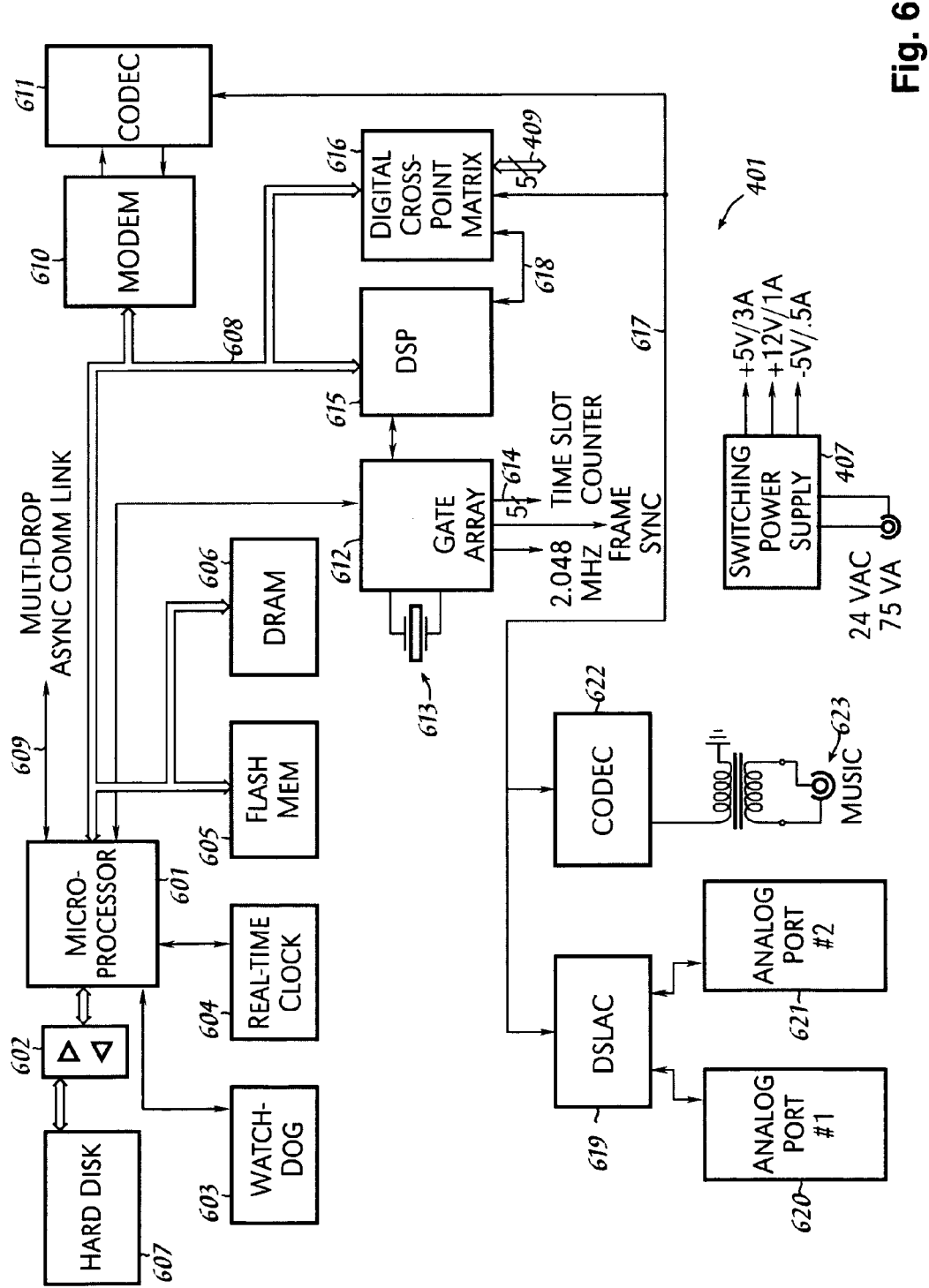
FIG. 6 illustrates a block diagram of main processing board.

Referring next to FIG. 6, there is illustrated, in block diagram form, main board 401 for integrating call processing and voice processing using a single processing means, which in this example is one microprocessor 601. Microprocessor 601, which may be a Motorola 68000 class microprocessor, communicates with hard disk 607 using driver circuitry 602. Hard disk 607 stores program data, voice prompts, voice mail messages, and all other types of speech used within main board 401. Microprocessor 601 also includes watchdog timer 603 and real-time clock source 604.

Microprocessor 601 is coupled via bus 608 to flash memory 605 and dynamic random access memory ("DRAM") 606. Flash memory 605 is used to store bootstrap data for use during power up of main board 401. DRAM 606 stores the program accessed by microprocessor 601 during operation of main board 401.

Bus 608 also couples microprocessor 601 to signal processing circuitry, which in this example is digital signal processor ("DSP") 615. Digital signal processor 615 implements a number of functions traditionally implemented by discrete analog components.

Figure 9:
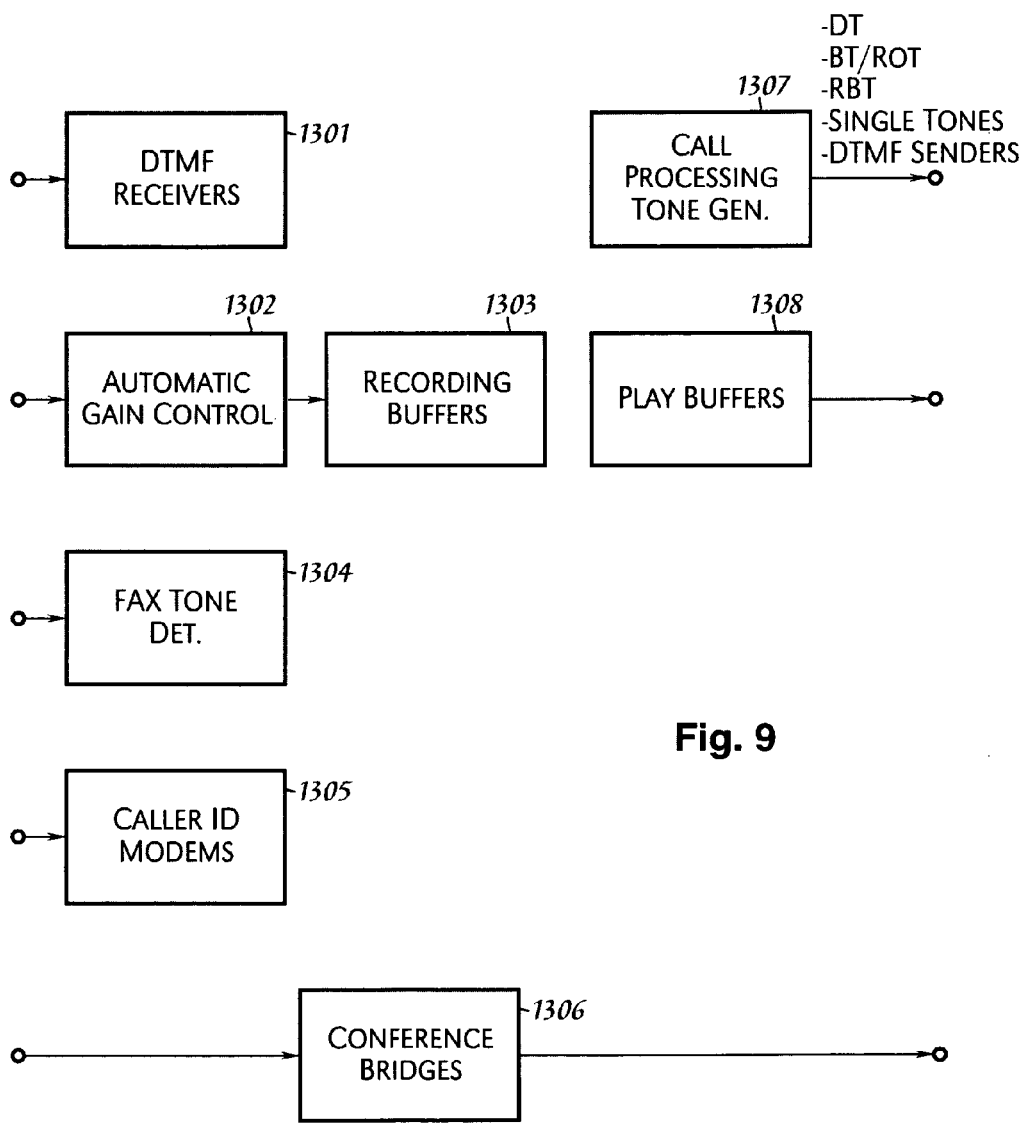
FIG. 9 illustrates functions implemented in the processing means of the main board.

Referring next to FIG. 9, there are illustrated some of the primary functions implemented in DSP 615. DTMF receivers 1301 are implemented using frequency domain filtering techniques. DTMF receivers 1301 detect all 16 standard DTMF (touch-tone) digits.

Automatic gain control ("AGC") 1302 is a closed-loop gain control system which normalizes received audio levels during recording.

Recording buffers 1303, which are coupled to AGC 1302, receive and store speech samples after they have passed through AGC block 1302. These speech samples are converted to μ-law PCM (Pulse Code Modulation) and double buffered (several samples per buffer). Microprocessor 601 copies the record data out of DSP buffers 1303 into RAM buffers (not shown), which are located in the microprocessor 601 data RAM area.

Fax tone detector 1304 is implemented using frequency domain filtering techniques. Fax tone detector 1304 detects the standard 1100 Hz FAX CNG tone (also referred to as the Calling Tone).

Caller ID modems 1305 are 1200 baud FSK modems similar to Bell 202-type modems. Caller ID modems 1305 are implemented as a frequency discriminator where a time delayed (quadrature) signal is multiplied by the original signal, low pass filtered, then sliced, which produce the square wave caller ID data stream.

Call processing tone generators 1307 are free running oscillators which generate the appropriate tones (and tone pairs) which make up the industry standard call processing tones. These tones include:

dial tone
busy/reorder tone
ring back tone
single frequency (440 Hz) tone
DTMF dialer tones Play buffers 1308 replay data from hard disk 607 through microprocessor 601 and place this play data in buffers 1308. This data is converted from an 8-bit μ-law PCM signal to 14-bit linear data.

Conference bridges 1306 allow multiple conference bridges to mix together conferees into a multi-party conference. These conferees may be a mixture of inside and outside parties. A combination of "loudest speaker" and "summing" is utilized.

DSP 615 communicates with microprocessor 601 via a host interface port ("HIP") via bus 608. The HIP link supports a command-based protocol, which is used to directly read or write DSP memory locations. DSP 615 is a RAM-based part and has its program downloaded from microprocessor 601. Once downloaded and running, microprocessor 601 (the host) polls for events or receives interrupts indicating that data is available. DSP 615 speech connections are made over an industry standard 32-time slot, 2.048 megabits per second (Mb/s) digital serial link 618. Link 618 occupies one of the digital highways implemented by digital cross-point matrix 616. Each service of DSP 615 occupies a single time slot. For example, DTMF receiver 1 occupies time slot 0 while conference bridge circuit 12 occupies time slot 31.

Digital cross-point matrix 616 is also coupled to bus 608 and operates to connect any voice path to any other voice path. Digital cross-point matrix 616 is a VLSI (Very Large Scale Integration) integrated circuit. An example of digital cross-point matrix 616 is manufactured by MITEL Semiconductor Corporation as part No. 8980. Digital cross-point matrix 616 communicates with microprocessor 601 via a memory mapped input/output (I/O) scheme. A command/control protocol is used for communication between microprocessor 601 and digital cross-point matrix 616 via bus 608. Cross-point matrix 616 is coupled by highway 618 to DSP 615. Cross-point matrix 616 is coupled to highway 617.

Digital cross-point matrix 616 is capable of making 256 simultaneous fully non-blocking connections. However, it may be upgraded by adding additional DSPs and/or cross-point matrices.

Gate array 612 is an SRAM (Static Random Access Memory) based device. An example of gate array 612 is manufactured by XILINX. Gate array 612 is responsible for generating all system timing. A master clock signal is provided by microprocessor 601 at 16.384 MHz. This clock signal is divided down to provide a number of phase coherent system clocks such as 4.096 MHz, 2.048 MHz and 8 KHz (frame sync). In addition, a 5-bit time slot counter is implemented which allows all the system CODECs to detect the appropriate time slot to use (0–31). An additional divider chain is included to divide the system clock down to 20 Hz, which is used by the ringing generator power supply (not shown).

Gate array 612 is downloaded at boot-up by system software. Gate array 612 is based on an SRAM architecture. That is, the internal fusible links commonly found in programmable logic are actually stored in volatile SRAM. Because of this architecture, gate array 612 is downloaded after power-up. Also, note the added flexibility of being able to modify the logic by simply loading new system software. Because the device is SRAM-based, it loses its programming when power is removed.

Bus 608 is also coupled to modem 610, which provides a capability of calling into system 401 on a remote basis to load additional programs, voice prompts, etc., or updates thereto, into hard disk 607. Modem 610 is coupled to coder/decoder ("CODEC") 611, which is coupled to highway 617. This connection allows coupling of modem 610 through cross-point matrix 616 to CO lines through bus 409 to the p-cards described with respect to FIG. 5.

Also coupled to highway 617 is dual subscriber line access chip (DSLAC) 619, which is well-known in the art, and which is coupled to analog ports 620 and 621, which provide an ability for system 401 to communicate to analog-type connections such as cordless telephones and fax machines.

Highway 617 is also coupled to CODEC 622, which is coupled to transformer 623 to a music source, which provides an ability to couple an external music source to a caller through cross-point matrix 616 for such things as providing the caller with music on hold.

Power to system 401 is provided through switching power supply 407, which converts AC to the various DC supply voltages needed by circuitry within system 401.

Figure 7:
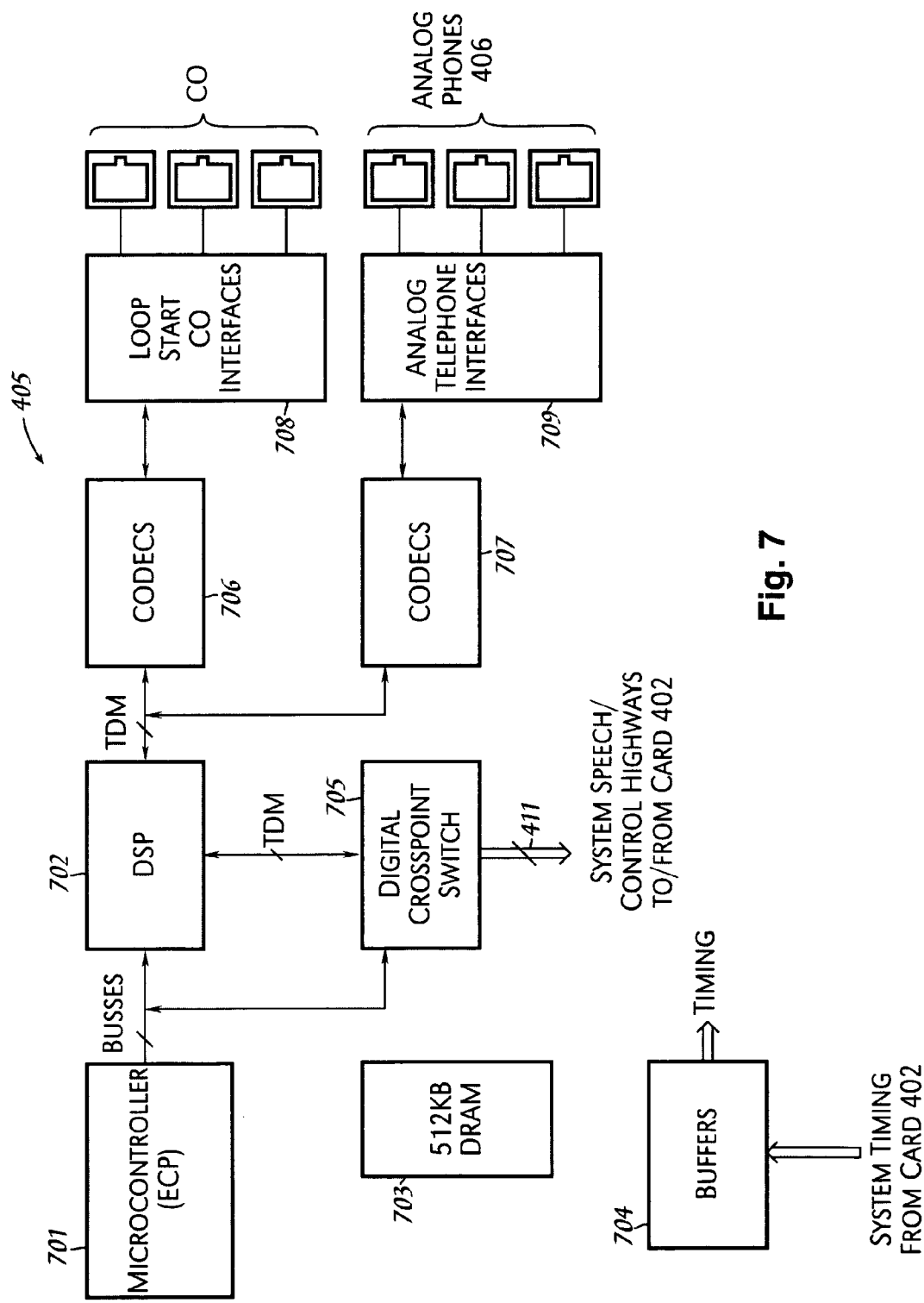
FIG. 7 illustrates a block diagram of a peripheral card.

Referring next to FIG. 7, there is illustrated peripheral-card ("p-card") 405, which is coupled to main board 401. Main board 401 communicates with p-card 405 via system speech/control highways 411. This connection 411 is made to microcontroller 701 via digital crosspoint switch 705. P-card 405 provides interconnections between CO lines and analog phone lines to network card 402.

Microcontroller 701 controls all the real-time functions associated with p-card 405. When p-card 405 is plugged into backplane 404, a card address is assigned to p-card 405. This card address is read by microcontroller 701 and is used to filter commands over communication link 411. When network card software wants to communicate with the specific p-card 405, the address is sent in the message packet which all p-cards 405 receive. P-cards 405 match the address in the message to the hard-wired address on the ribbon cable 411. If a match is made, only that p-card 405 responds to the command set.

Microcontroller 701 contains an internal program memory (not shown) and is connected to an external DRAM 703. The internal program memory contains a bootstrap program which upon reset or power-up, requests a fresh firmware load from network card 402. This firmware load is transferred to DRAM 703. Upon download completion, the program is run from within DRAM 703. This scheme allows for microcontroller 701 firmware to be updated and loaded at any time.

Network card 402 sources all system timing through buffers 704. Timing signals to p-card 405 consists of a 2.048 MHz clock signal, an 8 KHz frame sync, which signifies the first time slot of a 32 time slot highway, and 5 time slot counter bits, which represent a binary count from 0 to 31.

As mentioned above, p-card 405 is assigned a card slot address when it is connected to network card 402. This card slot address is used to calculate which time slots p-card 405 should be using. The time slots used for the CO codecs 706 and analog phone codecs 707 are generated by buffers 704.

The loop start central office (CO) lines are supplied by the local telephone company and consist of a wet balanced differential audio pair. The term "wet" refers to the fact that a voltage of −48 volts is present on the pair. The system requests dial tone from the CO by providing a nominal 200 ohm loop across the TIP and RING conductors and releases the connection by opening the loop. The CO rings the system by placing a 90 vrms AC, 20 Hz sine wave on the TIP and RING conductors. The system seizes the line by going off hook.

Interfaces 708 incorporate a circuit that monitors the voltage present across TIP and RING of each CO. This line voltage monitor circuit serves to detect the ring voltage present during ringing (ring detection) and the unique feature of monitoring the CO line status for conditions such as whether the CO is plugged in or if someone is off hook in front of the system. The latter can be used to detect theft of service or allow a credit card verification terminal to be used without interfering with normal system operation.

The voltage monitor circuit consists of a balanced differential op-amp connected across TIP and RING of the CO lines through a very high impedance (>10M ohms). The output of the four voltage monitor op-amps are fed to an analog-to-digital converter with a built-in analog multiplexer (not shown). Microcontroller 701 firmware monitors the line voltages.

There is also a balanced differential AC coupled op amp across the CO TIP and RING to monitor the low level audio tones present during caller ID. The output of these op-amps are selected via an analog switch during the idle period and are connected to the CO line codec 706.

To correctly terminate the CO line (seizure) care must be taken to satisfy the DC loop requirements (~200 ohms) and the AC impedance requirements (~600 ohms). The classic approach has been to terminate TIP and RING with an inductor (called a holding coil) which has a large inductance (>1 Hy) and a DC resistance of ~200 ohms. The inductor separates the AC and DC components to give the desired effect. The problem is that the inductor must be large enough not to saturate with currents as high as 100 milliamps. An inductor which satisfies these requirements is physically cumbersome.

P-card 405 incorporates a solid state inductor circuit called a gyrator (not shown) to implement the holding coil function. This single transistor emulates an inductor with the above requirements while taking up very little PCB space.

A small solid state relay (not shown) is used as the hook switch. When energized, the gyrator holding coil is placed across TIP and RING closing the loop. The audio present on TIP and RING is AC coupled to a small dry transformer. The secondary of this transformer is connected to the AC termination impedance and to the codec 708, which may be implemented on a dual subscriber line access chip ("DSLAC").

High voltage protection is provided for all paths on the TIP and RING connections. These paths include TIP to RING, TIP to GROUND, RING to GROUND, and TIP and RING to GROUND. This high voltage protection is accomplished by first passing the TIP and RING conductors through positive temperature coefficient varistors (not shown). These varistors act as resettable fuses. When excessive current flows through these varistors, they become resistive thus limiting the current flow. When the excessive current is stopped, the original resistance is restored.

Figure 8:
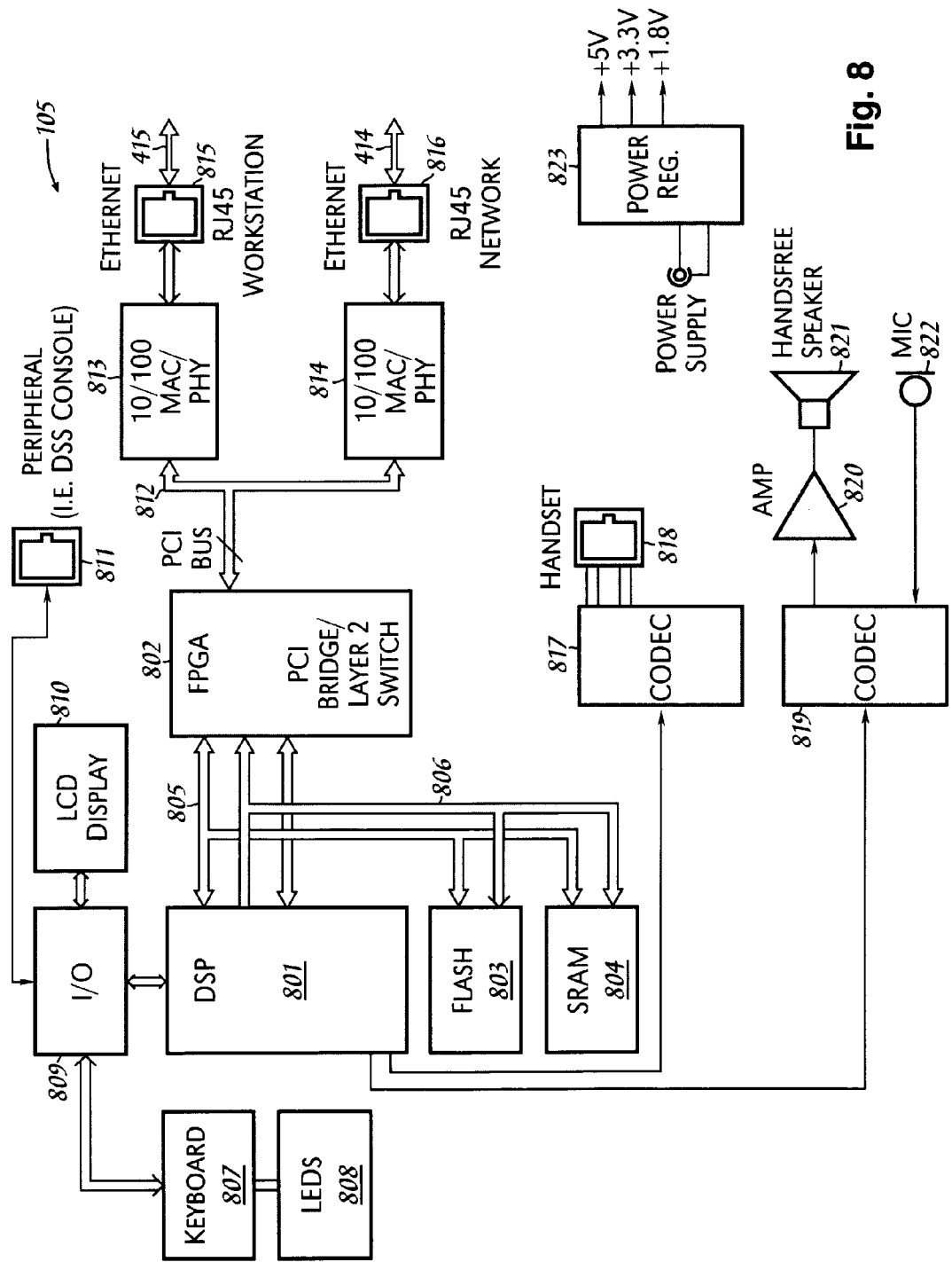
FIG. 8 illustrates a block diagram of a telephony device.

Referring to FIG. 8, there is illustrated a block diagram of further detail of IP telephony device 105. IP telephony device 105 may be a DSP based telephone instrument. Telephony device 105 communicates with the multimedia server 101 via the UDP/IP Protocol. PHYsical connection to the LAN is via an Ethernet 10/100 Base T interface. IP telephony device 105 contains the ability to perform layer-2 switching between two Ethernet ports in the telephony device for total control over voice versus data quality of service in accordance with the present invention. Speech samples are digitized, stored in 16 millisecond long packets and transmitted to the multimedia server 101 via the UDP/IP Protocol. As packets are received, they are triple-buffered to compensate for jitter before playback.

Connection 415 from workstation 106 is received by Ethernet RJ-45 connector 815, which is coupled to MAC/PHY device 813. Connection 414 between hub 103 and telephony device 105 is connected to RJ-45 connector 816 which is coupled to MAC/PHY device 814. Devices 813 and 814 are coupled by PCI bus 812 to FPGA/PCI bridge 802.

DSP 801 may be a Texas Instruments Model 5402 DSP; DSP 801 can be the only processor implemented within telephony device 105. DSP 801 performs typical DSP audio algorithms such as tone generation, gain, speaker phone algorithms, and energy detection. In addition, DSP 801 acts as a standard control processor performing such tasks as scanning the keyboard 807, lighting LED lamps 808, displaying LCD messages on LCD 810, performing UDP/IP stack functions, and communicating with devices 813, 814 via the PCI bus 812. Note that DSP 801 communicates with keyboard 807, LEDs 808, LCD display 810, and peripheral connection 811 by I/O device 809 in a typical manner. Peripheral connection 811 permits a coupling of DSP 801 to a DSS console. A DSS console may be a stand-alone device, which connects to the IP telephony device 105 to provide 64 individual LED lamps and keys. The lamps can be programmed by the user to monitor the status of individual stations, trunks or features. Pressing the key will access the associated function. Each telephony device in the system can connect to a DSS console. The DSS console communicates with the IP telephony device 105 via a 9600 baud serial communication link. The IP telephony device 105 does not contain a serial UART device, so the serial data protocol is controlled by software running in DSP 801. Physical connection between the telephony device and DSS console may be via a standard two pair modular line cord.

DSP 801 is coupled to an external FLASH memory 803 and a fast SRAM 804, and FPGA 802 via buses 805 and 806.

CODEC 817 and CODEC 819 perform analog to digital and digital to analog conversion of speech signals. CODEC 817 is connected to the handsets, speaker and microphone elements (not shown) via connector 818, while CODEC 819 is connected to the hands-free speaker 821 through amplifier 820, and to the hands-free microphone 822. Separating the functionality in this way permits the IP telephony device 105 to send tones or voice to one speaker while allowing a normal conversation over the other.

FPGA/PCI bridge 802 performs the functions required to connect telephone 105 to the 10/100 Base T Ethernet devices 813, 814. Since devices 813, 814 are designed to communicate via a standard PCI bus 812, the FPGA 802 implements a minimal PCI bus implementation. In addition, the FPGA 802 implements I/O latches and buffers as required.

Devices 813, 814 perform the Media Access Control and the PHYsical layer functions. Devices 813, 814 communicate to DSP 801 via a standard PCI bus 812, and communicate to the LAN via post-transformer coupled RJ-45 connections 815, 816. Devices 813, 814 can contain FIFOs to minimize lost packets during traffic peaks. Per the PCI bus mastering specification, devices 813, 814 take control of the buses 805, 806 and direct memory access (DMA) data directly to SRAM 804. Conversely, DSP 801 writes data to be sent into the SRAM 804 and the devices 813, 814 DMA the data via the PCI bus 812 to the LAN.

The present invention implements a voice mail system within an IP telephone system. While a user is accessing voice mail, it may be desirable for the user to be able to execute the same feature set, whether the recipient is located in the same building or in another state. For example, if a user in Dallas 301 wishes to copy a message to three people in his building, two people in Detroit 302, and one person at a home 303, the voice data may be actually transferred to each of the remote locations over the network 201. Such a transferred message becomes an actual message on the hard disk drive of each system.

The present invention also allows the user to visually see when there are messages in a voice mail box in another system. Pressing the virtual voice mail key will allow the user to access the messages in that mail box. The user then proceeds exactly as if the destination mail box was within this user's own system. A unique extension number will indicate to the system that the destination is at a remote site. The messages will be retrieved over a compressed voice channel in real-time.

This voice mail system of the present invention will also permit a user to either directly access messages in a mail box at a remote site or leave a message for another user at a remote site. Furthermore, a user in one site can transfer a caller to a voice mail box in another site. Additionally, a user will be enabled to either directly call or transfer a call to a user in another site.

The present invention also permits a user to move a message to a user in another site. This process first verifies that the destination user is valid then accepts the request. The voice mail file is transferred to the destination system over the network. Once transferred, the message appears as a new message to the destination and the associated message waiting indication is activated.

Figure 10:
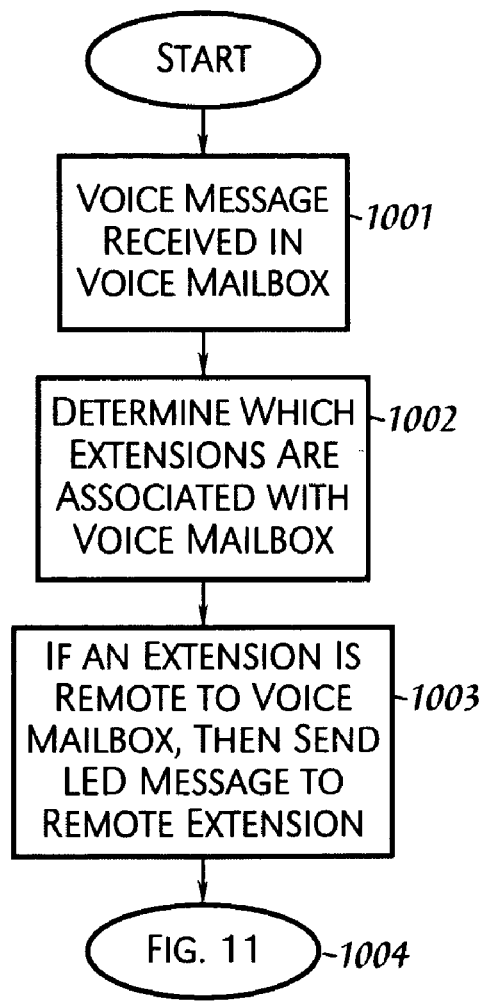
FIG. 10 illustrates a flow diagram of storage of a voice message.

Referring to FIG. 10, in step 1001, at a remote site (e.g., the Detroit LAN 302), a voice message is received within a voice mail box. In step 1002, the remote system 306 will determine which extensions within the IP system (e.g., WAN 201 and coupled LANs) are associated with this particular voice mail box. In step 1003, if an extension that is associated with that voice mail box is remote to the voice mail box (e.g., the extension is IP telephone 105 in LAN 301), then an LED message will be sent to the remote extension 105. The process will then proceed to step 1004, which is further described with respect to FIG. 11.

Figure 11:
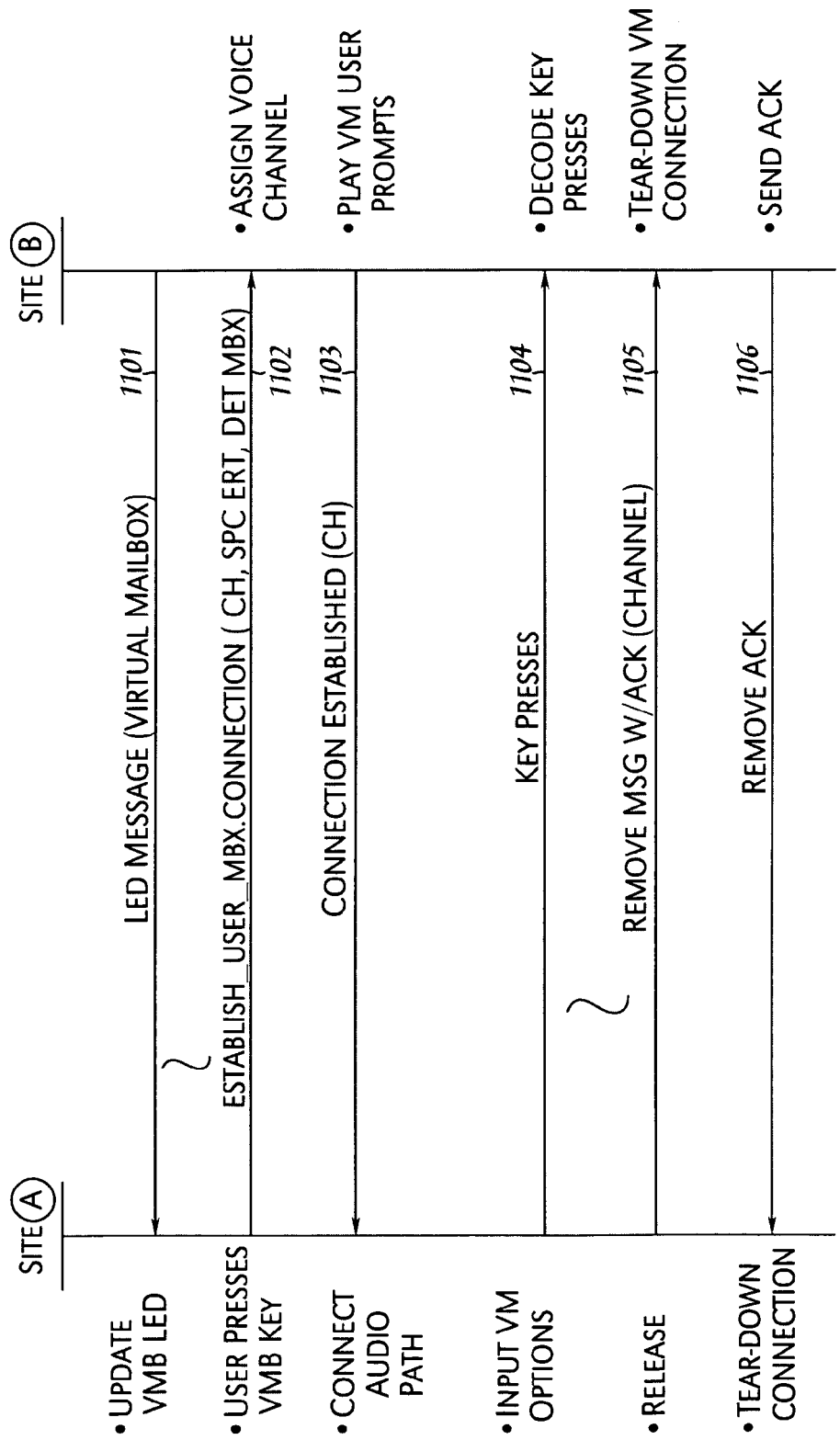
FIG. 11 illustrates a message flow over a WAN.

Referring to FIG. 11, there is illustrated an exemplary message flow between remote sites A and B. For example, site A could refer to the Dallas LAN 301 previously discussed, while site B could refer to the Detroit LAN 302, also discussed previously. As noted in FIG. 10, when a voice message is received within a remote voice mail box in site B, then an LED message 1101 will be sent from site B over the WAN 201 to the IP server 101 in site A. IP server 101 will then send a message to the IP telephone 105 to illuminate a voice mail box (VMB) LED 808 to indicate to that user that the remote mail box has a message. In the IP Series system, a number of inter-site messages are defined for specific tasks. Specifically, the VMB LED messages are issued based on system configuration. That is, if a system is configured to support a Virtual Mailbox, one of the required parameters is to enter the destination's extension number. This is handled by a Location-Extension combination (i.e., 73106). When a message is left in a mailbox with the Virtual Mailbox function enabled, the system sends the VMB LED message to the destination site. Once received by the destination site, the message is decoded and the appropriate LED is lit. Note that other types of indications or alerts can be utilized to inform a user that a remote message has been received, other than an LED light on a telephone. After some time has passed, when the user has noticed the VMB LED and wishes to listen to that voice message, the user will press the VMB key on phone 105. This sends an Establish_User_MBX_Connection message 1102 from the IP server 101 in site A to the IP server 306 in site B. When the Virtual Mailbox key on phone 105 is pressed, the call processing software evaluates the key type pressed. Once the Virtual Mailbox type is identified, call processing then checks the mailbox number associated with the key. If the key is associated with a remote site (as in this case), message 1102 if formatted and sent to the host site (where the voicemail message is actually stored). This message will include a Channel (CH) in which a connection will be established between sites A and B, the extension (EXT) of the source (SRC) of the message, which in this case is the extension number of telephone 105, and an identification of the destination (DEST) mail box (MBX) to which the message is directed within site B. In other words, the destination mail box will be the mail box that caused the illumination of the VMB LED 808 on phone 105.

In response to message 1102, IP server 306 within site B will assign a voice channel to be established within the WAN 201 between sites A and B. There is a pool of speech compression channels available for use between any remote sites. Call processing software determines that a call is destined for a remote site and assigns a compression channel from the pool. Note that except for basic inter-cabinet signaling (i.e., LED lamp messages), a speech path is required in advance, before a call can be made. Once a channel is assigned, a message is sent to the destination site requesting a connection. The destination site will assign an available speech compression channel, then accept the request for connection. A Connection Established message 1103 will be sent from site B to site A with the assigned channel, and site A will connect its IP server 101 to the established audio path to receive voice mail (VM) user prompt messages from site B. As mentioned above, once a connection has been established between sites, call processing software treats the remote connection as though it was to a local user. That is, call processing checks to see if the mailbox number is valid, requests any password information then executes normal local voicemail processing. Once the connection has been established between sites, voicemail feature operation is identical to that of a local voicemail user. The same voice prompts normally sent to the local phone are routed to the assigned speech compression channel. Such message prompts are what is typically heard in current voice mail systems when one accesses their voice mail. As the user at site A listens to the voice mail user prompts, the user may input VM options in response to such prompts on the DTMF buttons of telephone 105. Such key presses 1104 are sent over the established connection 1103 to site B, which decodes these key presses. The decoding of the key presses will result in permitting the user at site A to select various options for listening, saving, deleting, forwarding, etc., the voice mail message left in the voice mail box at site B.

After some time, when the user has completed the desired options within the voice mail system in site B remotely from site A, the user will release the system, such as hanging up IP telephone 105, which results in a Remove Message (MSG) with Acknowledgment (W/ACK) message 1105 sent to site B. Site B in response to message 1105, will tear down the voice mail connection established by message 1103, and send a Remove ACK message 1106 to site A to ensure that it also tears down the connection at the site A end.

Figure 12:
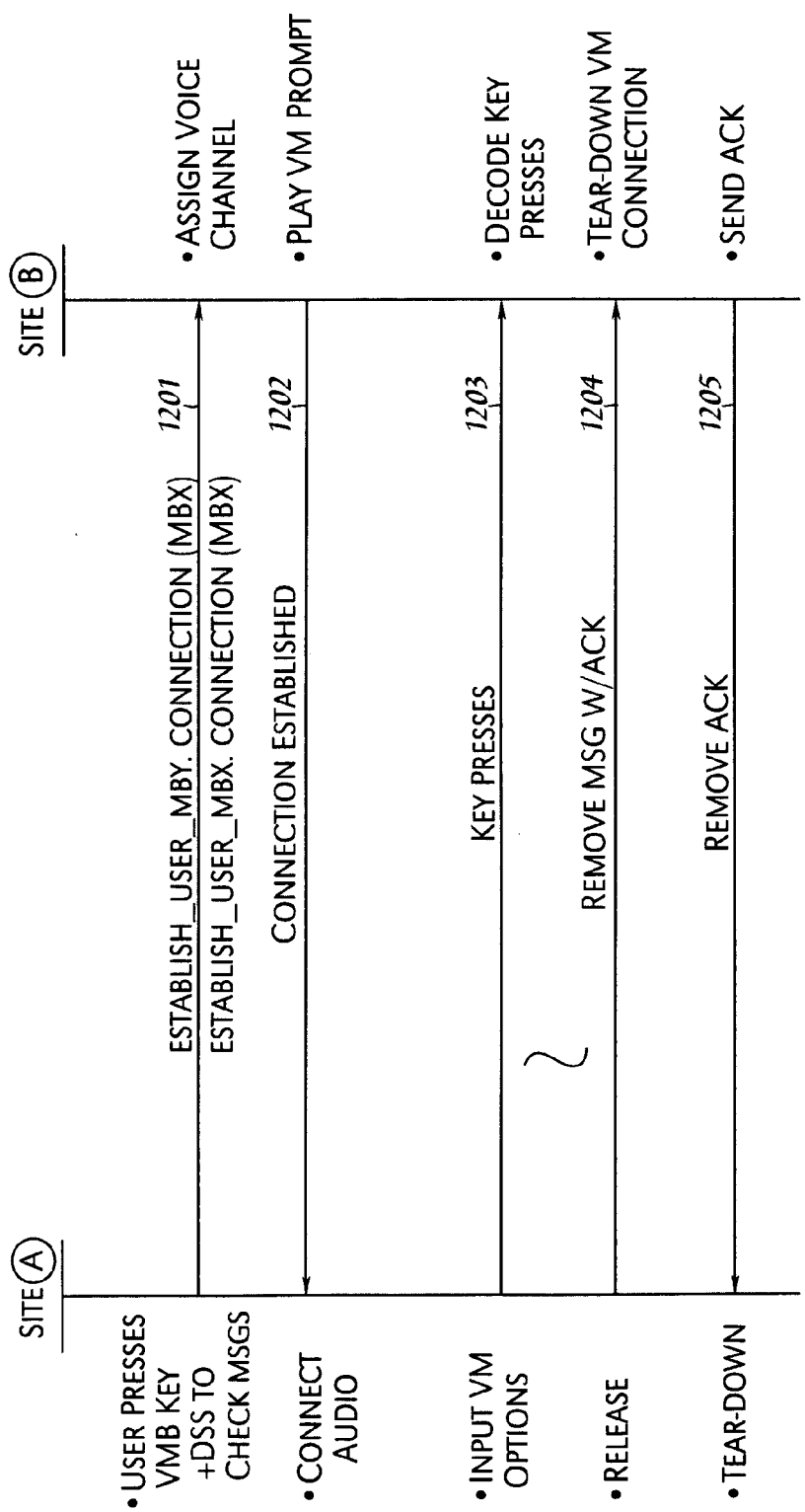
FIG. 12 illustrates another message flow over a WAN.

FIG. 12 illustrates an alternative embodiment of the present invention where a user at site A can remotely access a voice mail box at site B of another user. The user will press the voice mail button on their phone 105, along with the DSS key of the user whose mail box they wish to access. Alternatively, the user at phone 105 may enter in digits on the DTMF keys as opposed to the DSS key. This will send an Establish_User_MBX_Connection message 1201 to site B, which will assign a voice channel to be established between site A and B in response thereto. A connection established message 1202 will then be sent to site A, and site B will begin playing voice mail prompts to the user 105 at site A. In response to the voice mail prompts, the user may input voice mail options into phone 105, which results in key press messages 1203 to site B which decodes these key messages. After the user has completed their desired operations, the user at phone 105 will release resulting in a Remove Message with Acknowledgment 1204 to site B, which in response tears down the connection and sends a Remove Acknowledgment message 1205 to site A.

Figure 13:
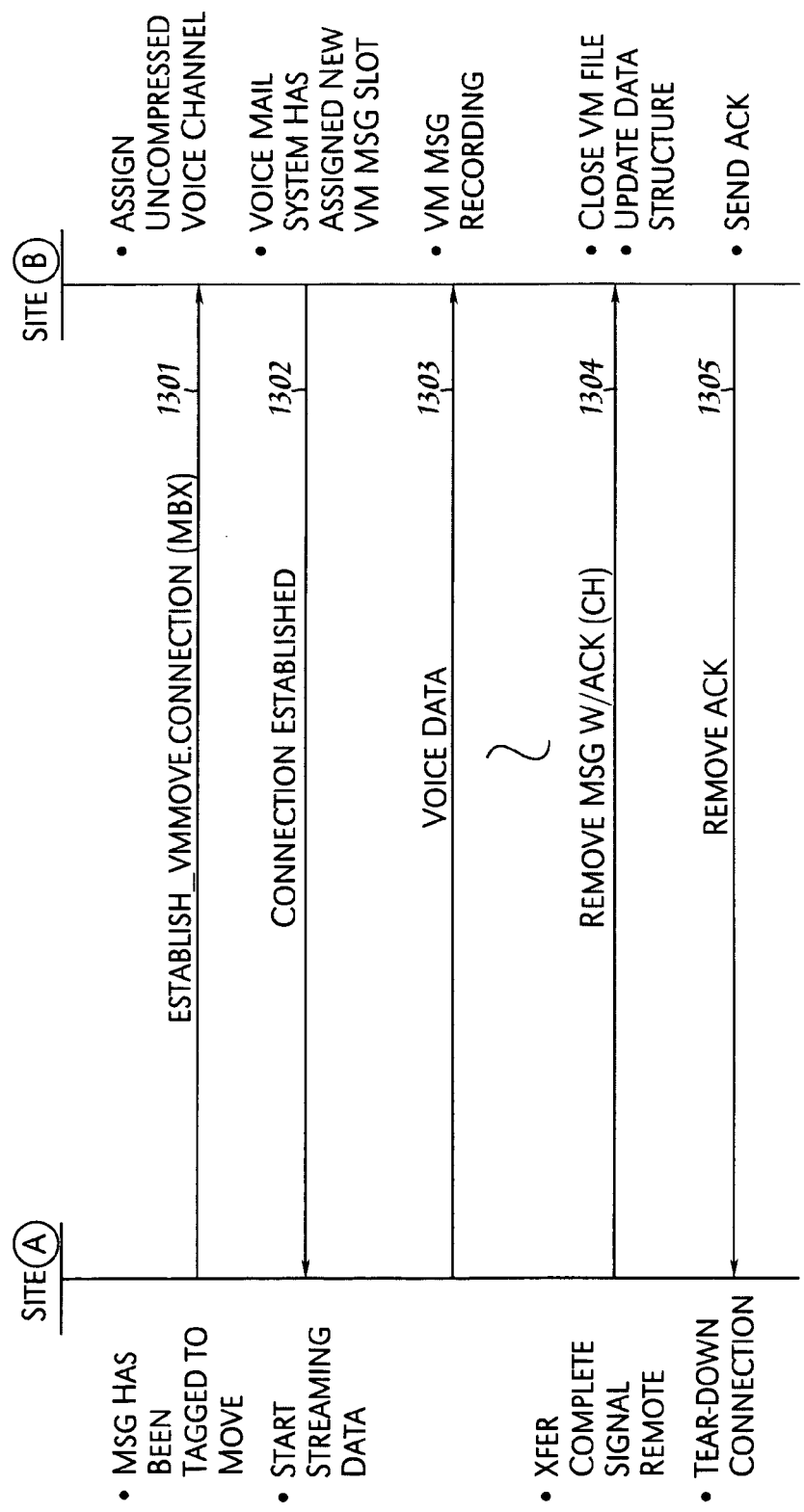
FIG. 13 illustrates another message flow over a WAN.

FIG. 13 illustrates another alternative embodiment of the present invention, which permits a user to move a message from one remote site to another. In this case, a user at telephone 105 at site A will wish to move a voice mail message to a user at telephone 308 over WAN 201. At IP telephone 105, a user has entered into a voice mail system and has decided that they wish to forward, or move, a voice message to a voice mail box at site B. Such a message could be resident within the user's voice mail box, or even a voice mail box of another user and accessed using the process in FIG. 12. Further, such a message may even be resident in a remote system and accessed by the user at telephone 105, such as described above with respect to FIG. 11. Nevertheless, the message has been tagged by the user for moving, which results in an Establish_VMMove_Connection message 1301 being sent from site A to site B. Site B will assign an uncompressed voice channel and respond with a Connection Established message 1302. Site B has thus assigned a new voice mail message slot within its system. And in response to the Connection Established message 1302, site A will begin streaming the data associated with the voice mail message as voice data 1303 to site B. The voice mail box at site B will begin recording the voice data. After that process has completed, a Remove Message 1304 will be sent from site A to site B indicating that it has completed its transfer process. Site B will close the voice mail file once the recording has completed and update its data and directories, and send an Acknowledgment message 1305 to site A so that it can tear down the connection.

Although the present invention and its advantages have been described in detail, it should be understood that various changes, substitutions and alterations can be made herein without departing from the spirit and scope of the invention as defined by the appended claims.

What is claimed is:

1. In a telecommunications system, a method comprising the steps of:

storing a voice mail message in a voice mail box in a voice mail system within a first LAN;

coupling a second LAN to the first LAN over a WAN, wherein the first LAN, the second LAN, and the WAN operate under a routable network protocol;

providing a sensory indication on a telecommunications device within the second LAN that the voice message is stored in the voice mail box within the first LAN; and the telecommunications device accessing the voice mail system within the first LAN to listen to the voice message stored in the voice mail box, wherein the step of the telecommunications device accessing the voice mail system within the first LAN to listen to the voice message stored in the voice mail box further comprises the steps of:

establishing a channel between the first and second LANs over the WAN;

coupling an audio path over the channel between the telecommunications device and the voice mail box; and streaming voice data containing the voice message from the voice mail box to the telecommunications device over the audio path, wherein the establishing step further comprises the steps of:

in response to an input at the telecommunications device, sending a user mail box connection message from the second LAN to the first LAN requesting a channel, wherein the user mail box connection message includes an extension associated with the telecommunications device and an identification of the voice mail box;

assigning the channel by the first LAN; and sending a connection established message from the first LAN to the second LAN.

2. In an information handling system comprising a first LAN, a second LAN, and a WAN coupling the first LAN to the second LAN using a TCP/IP protocol, a method comprising the steps of:

in response to selection of a voice mail access input and selection of a direct station select input at an IP telephone within the first LAN, sending a request from the first LAN to the second LAN over the WAN to establish a connection between the first LAN and the second LAN, wherein the direct station select input identifies a voice mail box within the second LAN;

establishing an audio path over the connection between the voice mail box and the IP telephone; and playing a voice message stored in the voice mail box over a speaker in the IP telephone as a result of sending audio data containing the voice message over the audio path.

3. The system as recited in claim 2, further comprising the step of:

moving the voice mail message from the voice mail box in the second LAN to a voice mail box in the first LAN in response to user inputs at the IP telephone.

4. An information handling system comprising a first LAN, a second LAN, and a WAN coupling the first LAN to the second LAN using a network protocol, the system comprising:

means for sending a request from the first LAN to the second LAN over the WAN to establish a connection between the first LAN and the second LAN in response to selection of a voice mail access input and selection of a direct station select input at a telephone within the first LAN, wherein the direct station select input identifies a voice mail box within the second LAN;

means for establishing an audio path over the connection between the voice mail box and the telephone; and means for playing a voice message stored in the voice mail box over a speaker in the telephone as a result of sending audio data containing the voice message over the audio path.

5. The system as recited in claim 4, further comprising:

means for moving the voice mail message from the voice mail box in the second LAN to a voice mail box in the first LAN in response to user inputs at the telephone.

* * * * *